(12) United States Patent
Chae et al.

(10) Patent No.: US 10,865,865 B2
(45) Date of Patent: Dec. 15, 2020

(54) POWERTRAIN FOR VEHICLE

(71) Applicants: Hyundai Motor Company, Seoul (KR); Kia Motors Corporation, Seoul (KR)

(72) Inventors: Min Ho Chae, Incheon (KR); Yong Uk Shin, Suwon-si (KR); Soon Ki Eo, Ansan-si (KR); Sun Sung Kwon, Anyang-si (KR); Chon Ok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 31 days.

(21) Appl. No.: 16/436,042

(22) Filed: Jun. 10, 2019

(65) Prior Publication Data

US 2020/0263740 A1 Aug. 20, 2020

(30) Foreign Application Priority Data

Feb. 15, 2019 (KR) .................... 10-2019-0018051

(51) Int. Cl.
| F16H 48/24 | (2006.01) |
| F16H 48/38 | (2012.01) |
| F16H 3/089 | (2006.01) |
| F16D 13/04 | (2006.01) |
| F16D 13/76 | (2006.01) |

(Continued)

(52) U.S. Cl.
CPC .............. *F16H 48/24* (2013.01); *F16H 3/089* (2013.01); *F16H 48/38* (2013.01); *F16D 13/04* (2013.01); *F16D 13/76* (2013.01); *F16H 48/10* (2013.01); *F16H 48/22* (2013.01); *F16H 2048/106* (2013.01)

(58) Field of Classification Search
CPC .............. F16H 48/24; F16H 2048/106; F16H 3/089–091; F16H 3/093–097; B60K 17/02; B60K 17/08; B60K 17/165; B60K 2007/0061
See application file for complete search history.

(56) References Cited

U.S. PATENT DOCUMENTS

| 5,951,433 A * | 9/1999 | Tsukamoto .............. F16H 3/663 475/281 |
| 10,596,904 B2 * | 3/2020 | Chae ........................ B60K 1/00 |

(Continued)

FOREIGN PATENT DOCUMENTS

KR 10-2012-0118925 A 10/2012

*Primary Examiner* — David R Morris
(74) *Attorney, Agent, or Firm* — Morgan, Lewis & Bockius LLP (57) ABSTRACT

A powertrain may include drive gears provided in an input shaft; an output shaft configured such that a differential is connected thereto; a first driven gear and a second driven gear rotatably provided in the output shaft to be engaged with the drive gears to form respective gear stages; a first clutch and a second clutch; two driveshafts provided to output power in opposed directions from the differential; and a third clutch configured to change a connection relationship among a selected driveshaft of the two driveshafts, the second driven gear, and the output shaft by sliding along an axial direction of the input shaft while being connected to the output shaft via the second clutch.

7 Claims, 6 Drawing Sheets

(51) Int. Cl.
*F16H 48/10* (2012.01)
*F16H 48/22* (2006.01)

(56) References Cited

U.S. PATENT DOCUMENTS

| | | | |
|---|---|---|---|
| 2004/0029673 A1* | 2/2004 | Lipman | B60K 23/0808 |
| | | | 475/284 |
| 2008/0271554 A1* | 11/2008 | Mohr | F16D 23/04 |
| | | | 74/318 |
| 2019/0168600 A1* | 6/2019 | Lian | F16H 48/24 |
| 2020/0039352 A1* | 2/2020 | Chae | B60K 28/165 |
| 2020/0072334 A1* | 3/2020 | Chae | F16H 3/089 |

\* cited by examiner

POWERTRAIN FOR VEHICLE

CROSS REFERENCE TO RELATED APPLICATION

The present application claims priority to Korean Patent Application No. 10-2019-0018051, filed Feb. 15, 2019, the entire contents of which is incorporated herein for all purposes by this reference.

BACKGROUND OF THE INVENTION

Field of the Invention

The present invention relates generally to a powertrain for a vehicle. More particularly, the present invention relates to a configuration of a powertrain for a vehicle, the powertrain having a limited slip differential (LSD) function.

Description of Related Art

In a powertrain for a vehicle, a differential is essential, but on a low friction road or a rough road, the vehicle cannot be driven by differential action. To solve this, it is necessary to have an LSD function in the powertrain.

The powertrain is configured to implement the LSD function and have low power transmission loss while having a simple structure, thus ensuring high power transmission efficiency.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a vehicle, the powertrain being configured to realize the LSD function while having a simple structure, and ensure high power transmission efficiency by minimizing power transmission loss during running of the vehicle, improving driving performance, fuel economy, and mileage of a vehicle.

In various aspects of the present invention, there is provided a powertrain for a vehicle, the powertrain including: an input shaft receiving power; drive gears provided in the input shaft; an output shaft disposed parallel to the input shaft, and configured such that a differential is connected thereto; a first driven gear and a second driven gear rotatably provided in the output shaft to be engaged with the drive gears to form respective gear stages; a first clutch configured to selectively connect the first driven gear to the output shaft; a second clutch configured to selectively connect the second driven gear to the output shaft; two driveshafts provided to output power in opposed directions from the differential; and a third clutch configured to change a connection relationship among a selected driveshaft of the two driveshafts, the second driven gear, and the output shaft by sliding along an axial direction of the input shaft while being connected to the output shaft via the second clutch.

The third clutch may include: a main sleeve splined to a hub connected to the output shaft via the second clutch; and a sub-sleeve provided to be rotatable with respect to the main sleeve while sliding in the axial direction is constrained.

The main sleeve may be provided with a first spline configured to be selectively engageable with the selected driveshaft, and a second spline configured to be selectively engageable with the second driven gear; and the sub-sleeve may be provided with a third spline configured to be selectively engageable with the output shaft, and a fourth spline configured to be selectively engageable with the second driven gear.

The main sleeve may be configured to be slidable to five discrete positions sequentially provided along the axial direction thereof; and the five positions are positions of 1lsd, 1, N, 2, and 2lsd in order, and as the main sleeve is moved to each position, at the 1lsd position, the first spline may be engaged with the selected driveshaft; at the 1 position, none of the splines may be engaged; at the N position, the second spline may be engaged with the second driven gear; at the 2 position, the third spline may be engaged with the output shaft, and the fourth spline may be engaged with the second driven gear, to directly connect the second driven gear to the output shaft; and at the 2lsd position, the third spline may be engaged with the output shaft, the fourth spline may be engaged with the second driven gear, and the first spline may be engaged with the selected driveshaft.

The selected driveshaft may be provided with a first coupling portion engaged with the first spline when the main sleeve is at the 1lsd position, and a second coupling portion engaged with the first spline when the main sleeve is at the 2lsd position, the first coupling portion and the second coupling portion being spaced from each other along the axial direction thereof.

The second driven gear may be provided with a third coupling portion engaged with the second spline when the main sleeve is at the N position, and a fourth coupling portion engaged with the fourth spline when the main sleeve is at the 2 position and the 2lsd position, the third coupling portion and the fourth coupling portion being spaced from each other in a radial direction thereof.

The input shaft may be integrally provided with a first drive gear engaged with the first driven gear; the input shaft may be integrally provided with a second drive gear engaged with the second driven gear; and a gear ratio formed by the first drive gear and the first driven gear may be greater than a gear ratio formed by the second drive gear and the second driven gear.

Each of the first clutch and the second clutch may be constituted by a friction clutch.

The present invention is configured to realize the LSD function while having a simple structure, and ensure high power transmission efficiency by minimizing the power transmission loss during running of the vehicle, improving driving performance, fuel economy, and mileage of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an exemplary embodiment of the present invention will be described in detail with reference to the accompanying drawings.

Figure 1A:
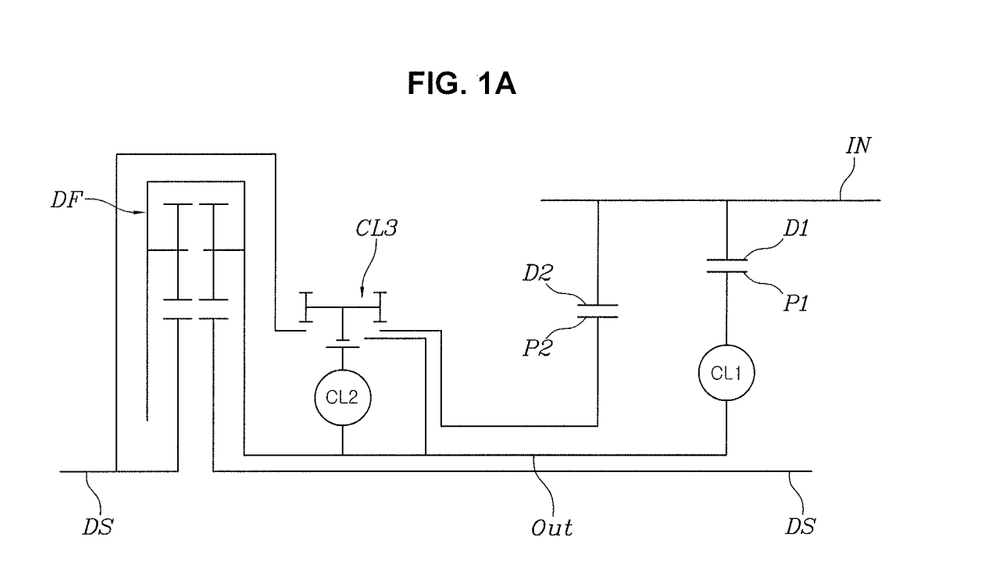
FIG. 1A and FIG. 1B is a view exemplarily illustrating a structure of a powertrain for a vehicle according to an exemplary embodiment of the present invention.
Figure 1B:
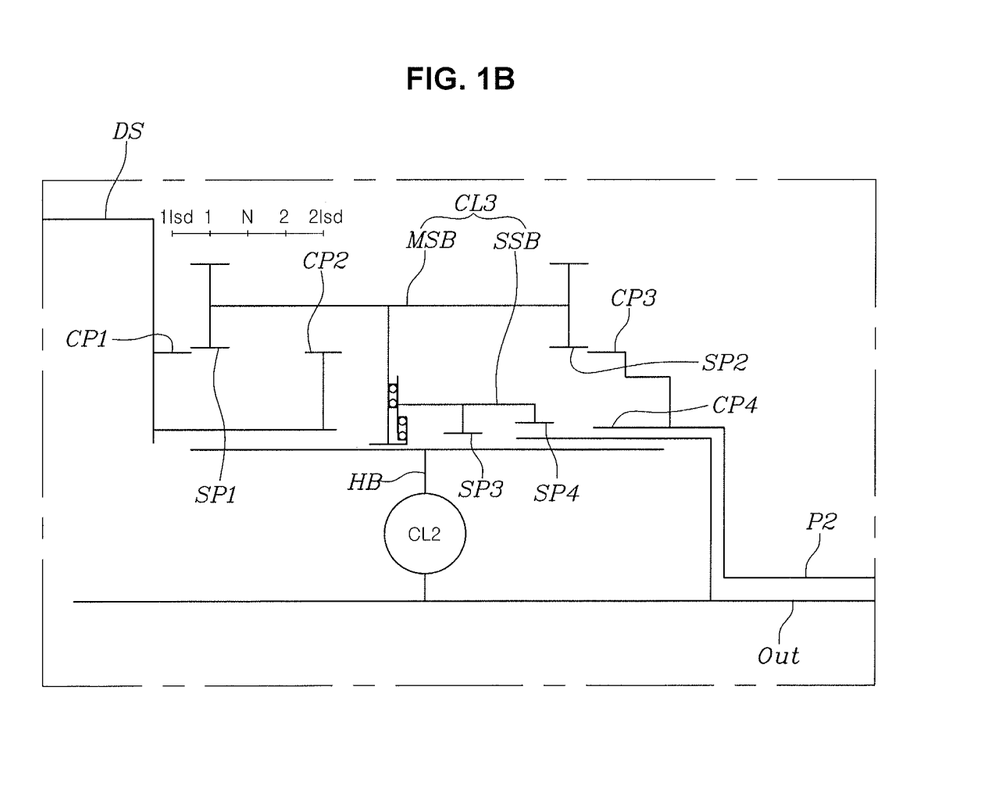

Referring to FIG. 1A and FIG. 1B, an exemplary embodiment of a powertrain for a vehicle according to an exemplary embodiment of the present invention may include an input shaft IN receiving power; first and second drive gears D1 and D2 provided in the input shaft IN; an output shaft OUT disposed parallel to the input shaft IN, and configured such that a differential DF is connected thereto; a first driven gear P1 and a second driven gear P2 rotatably provided in the output shaft OUT to be engaged with the first and second drive gears D1 and D2 to form respective gear stages; a first clutch CL1 provided to selectively connect the first driven gear P1 to the output shaft OUT; a second clutch CL2 provided to selectively connect the second driven gear P2 to the output shaft OUT; two driveshafts DS provided to output power in opposed directions from the differential DF; and a third clutch CL3 provided to change a connection relationship among a selected driveshaft of the two driveshafts DS, the second driven gear P2, and the output shaft OUT by sliding along an axial direction of the input shaft IN while being connected to the output shaft OUT via the second clutch CL2.

In other words, the exemplary embodiment of the present invention is configured to selectively transmit the power from the input shaft IN to the output shaft OUT via the first driven gear P1 or the second driven gear P2, to implement two gear stages, and the power transmitted to the output shaft OUT is transmitted to both drive wheels via the differential DF and the two driveshafts DS.

In the exemplary embodiment of the present invention, the selected driveshaft is the left driveshaft connected to the left drive wheel in the drawing, but the driveshaft connected to the right drive wheel may also be configured to function as the selected driveshaft.

Each of the first clutch CL1 and the second clutch CL2 is constituted by a friction clutch, and the third clutch CL3 is constituted by a mesh type clutch.

The friction clutch may be a dry or wet clutch which is configured such that a frictional force of the clutch is changed by adjusting the engagement force of the clutch and thus, a torque transmitted through the clutch may be continuously varied; and the mesh type clutch refers to a clutch such as a dog clutch and a synchromesh device, which is configured to transmit power when gears are engaged with each other, and once gears are engaged, external power is not required to maintain the engaged state.

The third clutch CL3 includes: a main sleeve MSB splined to a hub HB connected to the output shaft OUT via the second clutch CL2; and a sub-sleeve SSB provided to be rotatable with respect to the main sleeve MSB while sliding in the axial direction is constrained.

The main sleeve MSB is provided with a first spline SP1 configured to be selectively engageable with the selected driveshaft DS, and a second spline SP2 configured to be selectively engageable with the second driven gear P2.

The sub-sleeve SSB is provided with a third spline SP3 configured to be selectively engageable with the output shaft OUT, and a fourth spline SP4 configured to be selectively engageable with the second driven gear P2.

Referring to FIGS. 1 to 6, the main sleeve MSB is configured to be slidable to five discrete positions sequentially provided along the axial direction thereof; and the five positions are positions of 1lsd, 1, N, 2, and 2lsd in order, and as the main sleeve MSB is moved to each position, at the 1lsd position, the first spline SP1 is engaged with the selected driveshaft DS; at the 1 position, none of the splines are engaged; at the N position, the second spline SP2 is engaged with the second driven gear P2; at the 2 position, the third spline SP3 is engaged with the output shaft OUT, and the fourth spline SP4 is engaged with the second driven gear P2, to directly connect the second driven gear P2 to the output shaft OUT; and at the 2lsd position, the third spline SP3 is engaged with the output shaft OUT, the fourth spline SP4 is engaged with the second driven gear P2, and the first spline SP1 is engaged with the selected driveshaft DS.

The selected driveshaft DS is provided with a first coupling portion CP1 engaged with the first spline SP1 when the main sleeve MSB is at the 1lsd position, and a second coupling portion CP2 engaged with the first spline SP1 when the main sleeve MSB is at the 2lsd position, the first coupling portion and the second coupling portion being spaced from each other along the axial direction thereof.

The second driven gear P2 is provided with a third coupling portion CP3 engaged with the second spline SP2 when the main sleeve MSB is at the N position, and a fourth coupling portion CP4 engaged with the fourth spline SP4 when the main sleeve MSB is at the 2 position and the 2lsd position, the third coupling portion and the fourth coupling portion being spaced from each other in a radial direction thereof.

The input shaft IN is integrally provided with a first drive gear D1 engaged with the first driven gear P1, the input shaft IN is integrally provided with a second drive gear D2 engaged with the second driven gear P2, and a gear ratio formed by the first drive gear D1 and the first driven gear P1 is greater than a gear ratio formed by the second drive gear D2 and the second driven gear P2.

In other words, when the first drive gear D1 and the first driven gear P1 form a first gear stage, the second drive gear D2 and the second driven gear P2 form a second gear stage.

For reference, the differential DF shown in FIG. 1A and FIG. 1B refers to a spur-gear differential, but the present invention is not limited thereto and a general differential configuration using bevel gear or planetary gear system may be used.

Furthermore, the first clutch CL1, the second clutch CL2, and the third clutch CL3 are configured to be controlled by a separate controller, and the main sleeve MSB forming the third clutch CL3 is configured to linearly slide on the hub HB along the axial direction of the input shaft IN by a conventional mechanism in which a separate actuator linearly moves a shift fork.

Figure 2A:
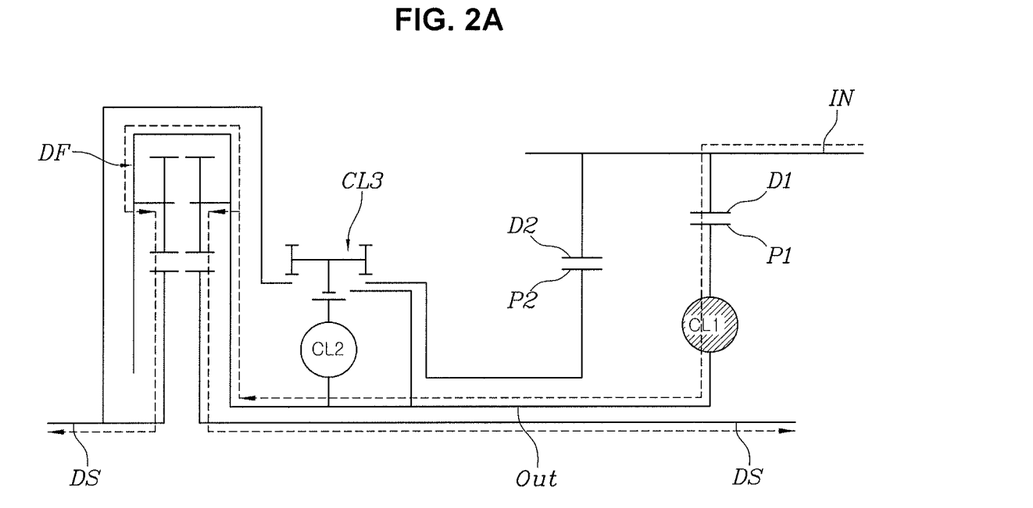
FIG. 2A and FIG. 2B is a view exemplarily illustrating a state where the powertrain of FIG. 1A and FIG. 1B implements a first stage operation mode.
Figure 2B:
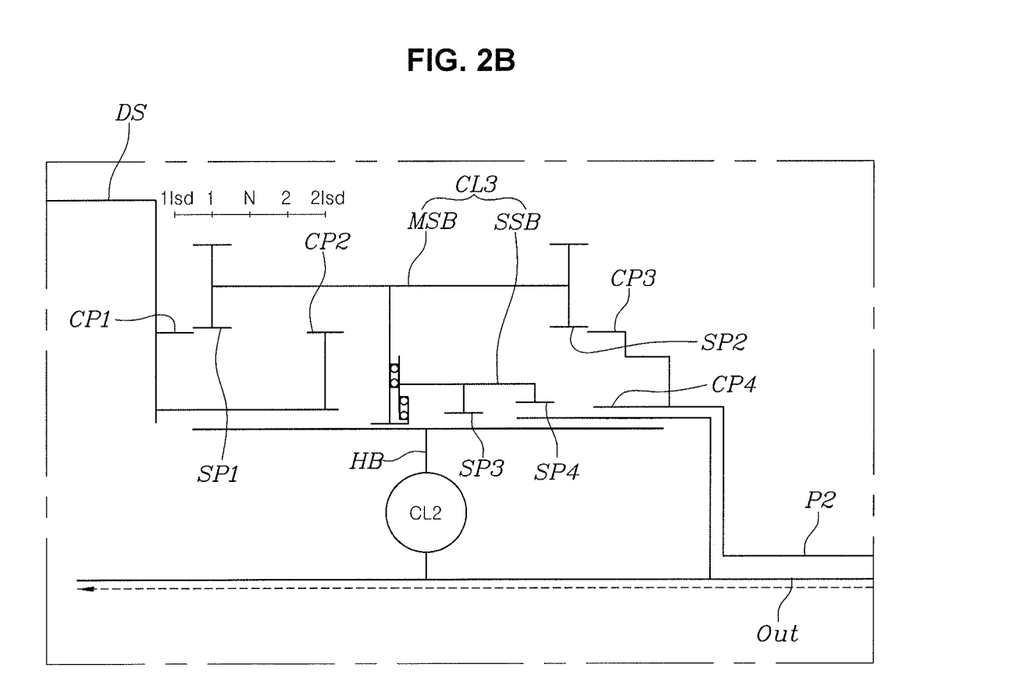

FIG. 2A and FIG. 2B shows a state where the powertrain of the present invention implements a 1-speed range, wherein since the main sleeve MSB is at the 1 position, none of the splines of the main sleeve MSB and the sub-sleeve SSB are engaged, by the first clutch CL1 being engaged, the power of the input shaft IN is transmitted to the output shaft OUT via the first drive gear D1 and the first driven gear P1, and the power of the 1-speed range is output to the drive wheel via the two driveshafts DS.

Figure 3A:
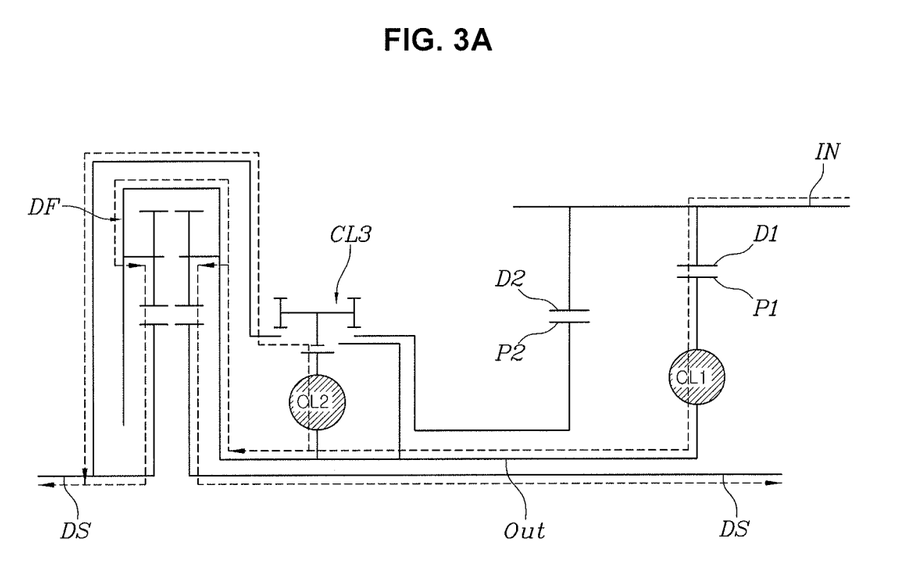
FIG. 3A and FIG. 3B is a view exemplarily illustrating a state where the powertrain of FIG. 1A and FIG. 1B implements a first stage-LSD operation mode.
Figure 3B:
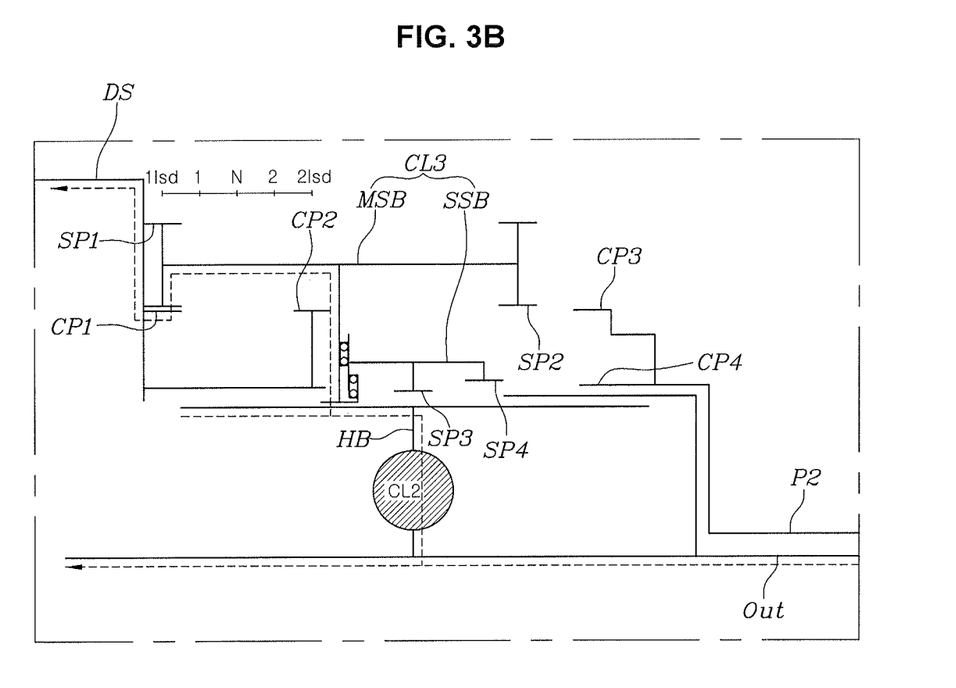

FIG. 3A and FIG. 3B shows a state where the powertrain of the present invention implements a first LSD speed range, wherein as described above, in the state where the first clutch CL1 is engaged and the power of the 1-speed range is output via the differential DF, since the main sleeve MSB is at the 1lsd position, the first spline SP1 is engaged with the first coupling portion CP1 of the selected driveshaft, so when the frictional force of the second clutch CL2 is controlled, the frictional force between the output shaft OUT and the selected driveshaft DS is changed accordingly to perform the LSD function.

For example, in the above described state, when the second clutch CL2 is fully engaged, the output shaft OUT and the two driveshafts DS are virtually integrated and rotated at the same speed, completely limiting the differential action of the differential DF.

Figure 4A:
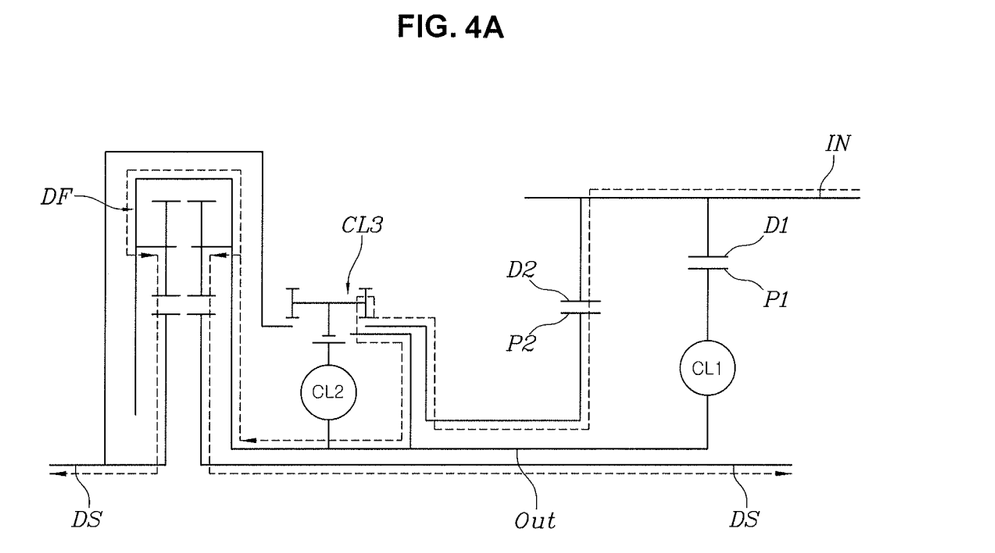
FIG. 4A and FIG. 4B is a view exemplarily illustrating a state where the powertrain of FIG. 1A and FIG. 1B implements a second stage operation mode.
Figure 4B:
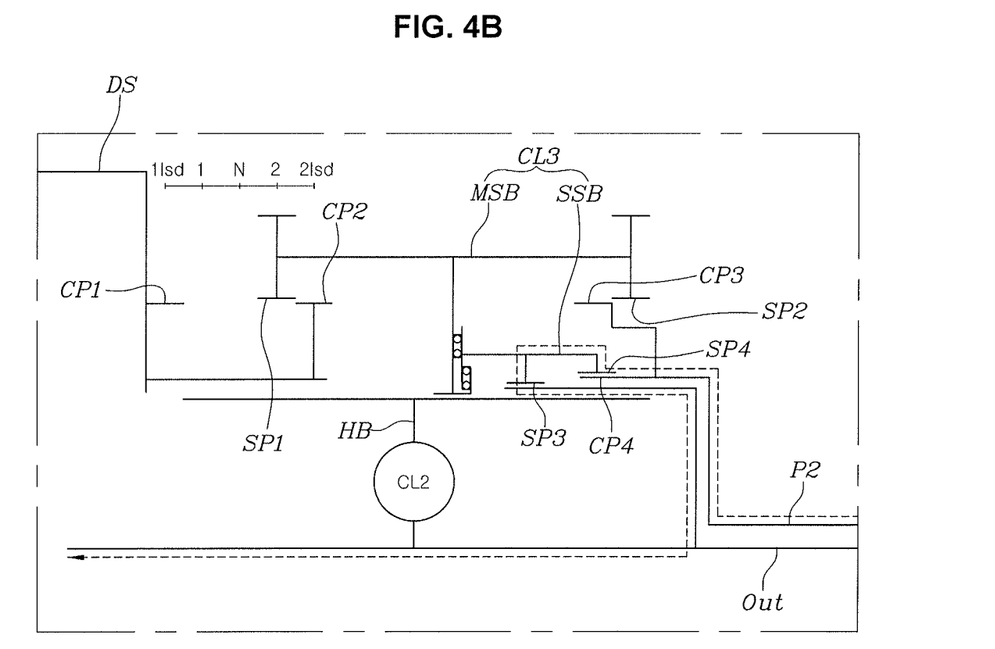

FIG. 4A and FIG. 4B shows a state where the powertrain of the present invention implements a 2-speed range, wherein since the main sleeve MSB is at the 2 position, the third spline SP3 is engaged with the output shaft OUT and the fourth spline SP4 is engaged with the second driven gear P2, and as a result, the second driven gear P2 is directly connected to the output shaft OUT.

Thus, the power of input shaft IN is shifted to the second gear ratio through the second drive gear D2 and the second driven gear P2, and is output through the differential DF.

Figure 5A:
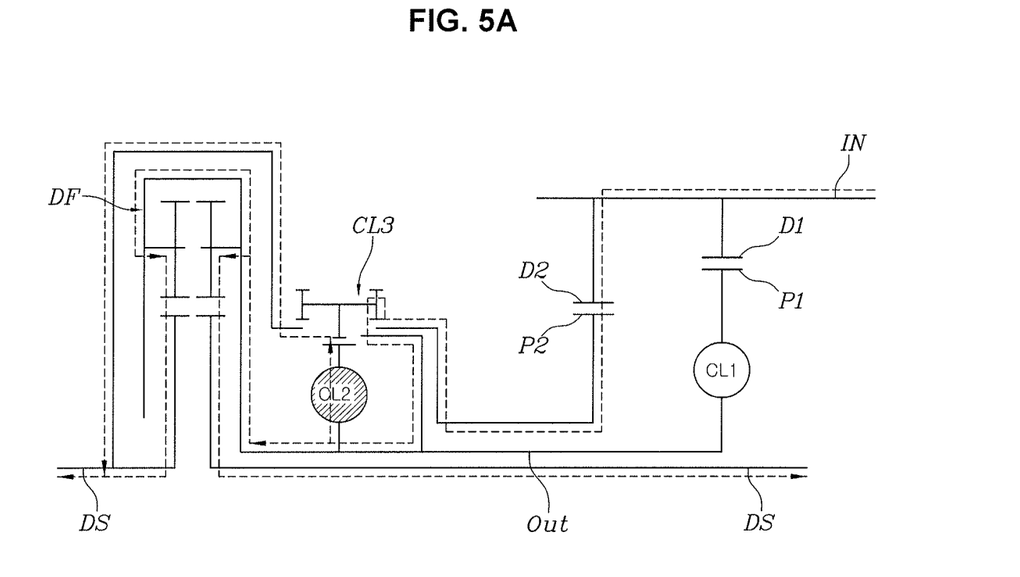
FIG. 5A and FIG. 5B is a view exemplarily illustrating a state where the powertrain of FIG. 1A and FIG. 1B implements a second stage-LSD operation mode.
Figure 5B:
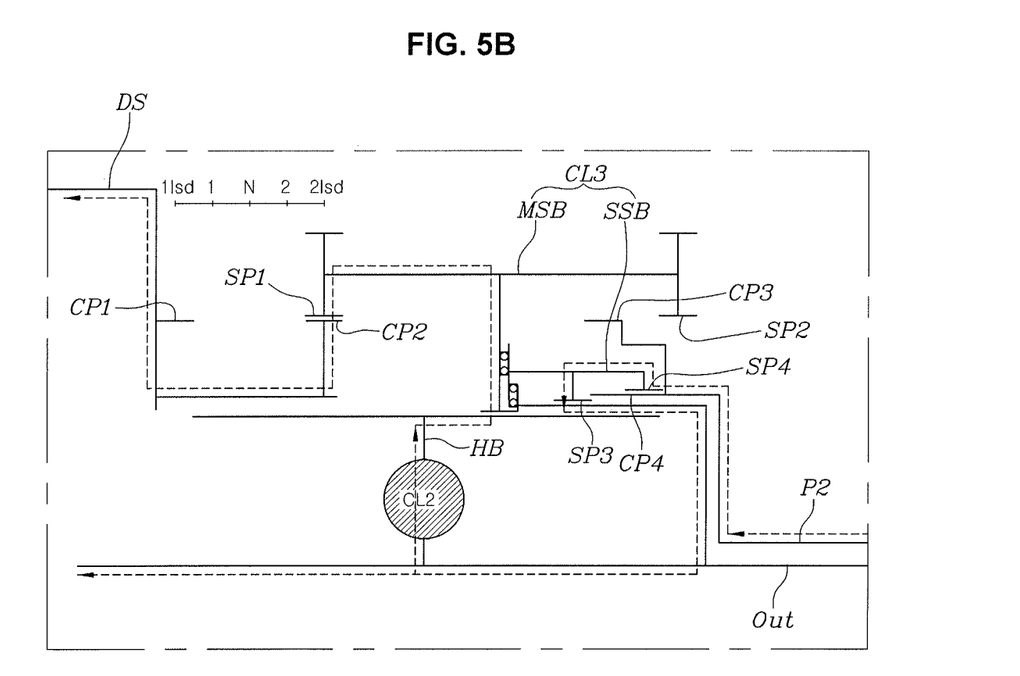

FIG. 5A and FIG. 5B shows a state where the powertrain of the present invention implements a second LSD speed range, wherein since the main sleeve MSB is at the 2lsd position, as in the 2-speed range, the third spline SP3 is still engaged with the output shaft OUT and the fourth spline SP4 is still engaged with the second driven gear P2, directly connecting the second driven gear P2 to the output shaft OUT to form 2-speed range, and in the present state, since the first spline SP1 is engaged with the selected driveshaft DS, when the frictional force of the second clutch CL2 is controlled, the output shaft OUT is directly coupled to the selected driveshaft DS, performing the LSD function.

Figure 6A:
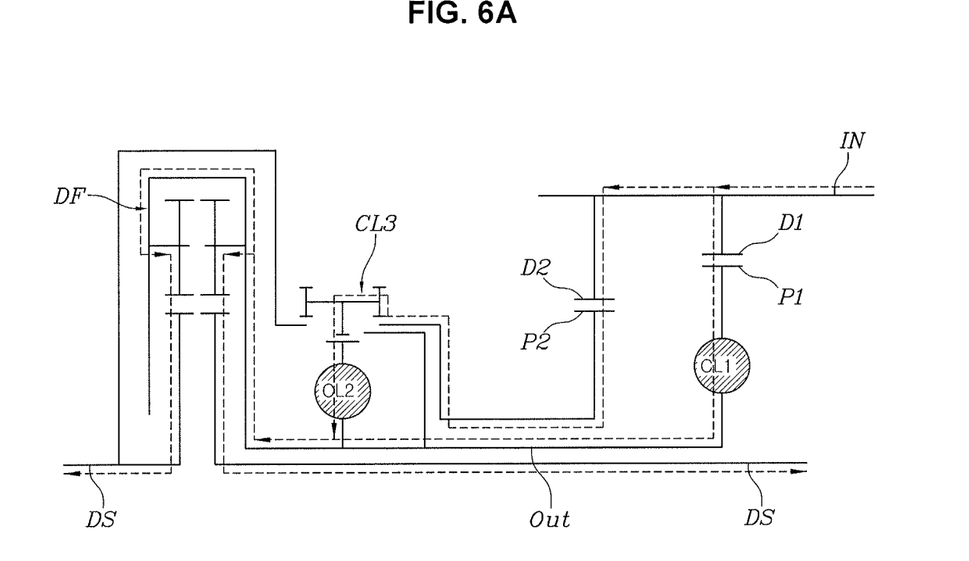
FIG. 6A and FIG. 6B is a view exemplarily illustrating a process of shifting from the first stage to the second stage by the powertrain of FIG. 1A and FIG. 1B.
Figure 6B:
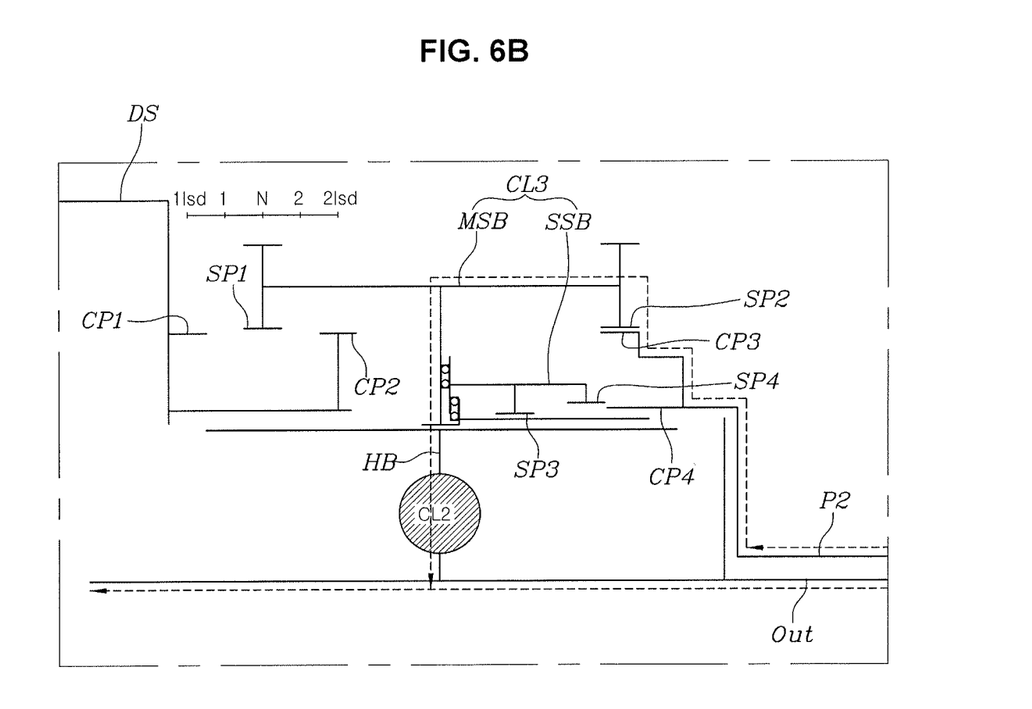

Meanwhile, FIG. 6A and FIG. 6B shows a process of shifting from the first stage to the second stage by the powertrain, wherein since the main sleeve MSB is at the N position, the second spline SP2 is engaged with the second driven gear P2.

In the instant state, since the first clutch CL1 is connected to the input shaft IN via the first driven gear P1 and the first drive gear D1, and the second clutch CL2 is connected to the input shaft IN via the second driven gear P2 and the second drive gear D2, which is a parallel structure, so clutch-to-clutch shifting in which shifting is performed by engaging one of the first clutch CL1 and the second clutch CL2 while releasing the other, smooth shifting between the first and second stages may be realized without torque interruption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain apparatus for a vehicle, the powertrain apparatus comprising:
   an input shaft receiving power;
   first and second drive gears provided on the input shaft;
   an output shaft mounted parallel to the input shaft, and configured such that a differential is connected thereto;
   a first driven gear and a second driven gear rotatably provided in the output shaft to be engaged with the first and second drive gears, respectively, to form respective gear stages;
   a first clutch configured to selectively connect the first driven gear to the output shaft;
   a second clutch configured to selectively connect the second driven gear to the output shaft;
   first and second driveshafts engaged to the differential and provided to output power in opposed directions from the differential; and
   a third clutch configured to change a connection relationship among a selected driveshaft of the first and second driveshafts, the second driven gear, and the output shaft by sliding along an axial direction of the input shaft while being connected to the output shaft via the second clutch,
   wherein the third clutch includes:
   a main sleeve splined to a hub connected to the output shaft via the second clutch; and a sub-sleeve provided to be rotatable with respect to the main sleeve while sliding in the axial direction is constrained.

2. The powertrain apparatus of claim 1,
wherein the main sleeve is provided with a first spline configured to be selectively engageable with the selected driveshaft, and a second spline configured to be selectively engageable with the second driven gear, and
wherein the sub-sleeve is provided with a third spline configured to be selectively engageable with the output shaft, and a fourth spline configured to be selectively engageable with the second driven gear.

3. The powertrain apparatus of claim 2,
wherein the main sleeve is configured to be slidable to five discrete positions sequentially provided along the axial direction, and
wherein the five positions are positions of 1lsd, 1, N, 2, and 2lsd in order, and
wherein
when the main sleeve is located at the 1lsd position, the first spline is engaged with the selected driveshaft;
when the main sleeve is located at the 1 position, the first spline is not engaged with the selected driveshaft, the second spline is not engaged with the second driven gear, the third spline is not engaged with the output shaft, and the fourth spline is not engaged with the second driven gear;
when the main sleeve is located at the N position, the second spline is engaged with the second driven gear;
when the main sleeve is located at the 2 position, the third spline is engaged with the output shaft, and the fourth spline is engaged with the second driven gear, to directly connect the second driven gear to the output shaft; and
when the main sleeve is located at the 2lsd position, the third spline is engaged with the output shaft, the fourth spline is engaged with the second driven gear, and the first spline is engaged with the selected driveshaft.

4. The powertrain apparatus of claim 3,
wherein the selected driveshaft is provided with a first coupling portion to be engaged with the first spline when the main sleeve is at the 1lsd position, and
wherein the selected driveshaft is provided with a second coupling portion to be engaged with the first spline when the main sleeve is at the 2lsd position,
wherein the first coupling portion and the second coupling portion are spaced from each other along the axial direction.

5. The powertrain apparatus of claim 3,
wherein the second driven gear is provided with a third coupling portion to be engaged with the second spline when the main sleeve is at the N position, and
wherein the second driven gear is provided with a fourth coupling portion to be engaged with the fourth spline when the main sleeve is at the 2 position and the 2lsd position,
wherein the third coupling portion and the fourth coupling portion are spaced from each other in a radial direction thereof.

6. The powertrain apparatus of claim 1,
wherein a gear ratio formed by the first drive gear and the first driven gear is greater than a gear ratio formed by the second drive gear and the second driven gear.

7. The powertrain apparatus of claim 1,
wherein each of the first clutch and the second clutch is a friction clutch.

* * * * *